United States Patent [19]

Courtright

[11] Patent Number: 5,286,499
[45] Date of Patent: Feb. 15, 1994

[54] CHEWING GUM WITH IMPROVED TASTE PERCEPTION EMPLOYING INVERT SUGAR HUMECTANT

[75] Inventor: Steven B. Courtright, Evanston, Ill.

[73] Assignee: Wm. Wrighley Jr. Company, Chicago, Ill.

[21] Appl. No.: 881,539

[22] Filed: May 12, 1992

Related U.S. Application Data

[63] Continuation-in-part of Ser. No. 632,151, Dec. 21, 1990.

[51] Int. Cl.⁵ .............................................. A23G 3/30
[52] U.S. Cl. ........................................ 426/3; 426/658
[58] Field of Search ............................... 426/3-6, 426/658

[56] References Cited

U.S. PATENT DOCUMENTS

| | | | |
|---|---|---|---|
| 1,786,831 | 12/1930 | Dellenbarger | 426/3 |
| 3,632,358 | 1/1972 | Echeandia et al. | 426/5 |
| 4,166,134 | 8/1979 | Witzel et al. | 426/3 |
| 4,271,198 | 6/1981 | Cherukuri et al. | 426/3 |
| 4,271,199 | 6/1981 | Cherukuri et al. | 426/5 |
| 4,352,825 | 10/1982 | Cherukuri et al. | 426/5 |
| 4,374,858 | 2/1983 | Glass et al. | 426/3 |
| 4,385,071 | 5/1983 | Yakimischak | 426/3 |
| 4,707,363 | 11/1987 | Sato et al. | 426/3 |
| 4,724,150 | 2/1988 | Knebl et al. | 426/3 |
| 4,824,680 | 4/1989 | Bernatz et al. | 426/3 |

OTHER PUBLICATIONS

Windholz, Ed., *Merck Index* 10th Edition p. 725, 1983.

*Primary Examiner*—Jeanette Hunter
*Attorney, Agent, or Firm*—Willian Brinks Hofer Gilson & Lione

[57] ABSTRACT

A chewing gum employing total invert sugar or medium invert sugar or a mixture thereof as a humectant. The chewing gum preferably comprises between about 0.1 to 5.0 percent by weight total invert sugar or between about 0.1 to 5.0 percent by weight medium invert sugar or between about 0.1 to 5.0 percent by weight of a mixture of total invert sugar and medium invert sugar. A method of manufacturing the chewing gum is also disclosed.

17 Claims, No Drawings

CHEWING GUM WITH IMPROVED TASTE PERCEPTION EMPLOYING INVERT SUGAR HUMECTANT

CROSS REFERENCE TO RELATED APPLICATION

The present invention is a continuation-in-part of U.S. patent application No. 07/632,151 filed Dec. 21, 1990.

FIELD OF THE INVENTION

The present invention relates to chewing gum compositions employing invert sugar as a humectant with improved taste qualities.

BACKGROUND OF THE INVENTION

Chewing gum has a tendency to get stale. Moisture is lost from the gum when the ambient relative humidity is less than the equilibrium relative humidity of the chewing gum composition. Under these conditions, the gum becomes stale and brittle.

Humectants are substances that promote the retention of moisture. Various humectants for chewing gum compositions have been disclosed. U.S. Pat. No. 4,166,134 discloses the use of sugar alcohols and U.S. Pat. No. 3,632,358 discloses the use of glycerin. U.S. Pat. No. 4,824,680 discloses an improved method to employ sorbitol as a humectant.

Invert sugar is a mixture of 50% glucose and 50% fructose made by the hydrolysis of sucrose. Sucrose is a disaccharide in which one molecule of α-D-glucose in the pyranose or six-membered ring form is condensed with one molecule of β-D-fructose in the furanose or five-membered ring form through their respective acetal and ketal functions. Sucrose is nonreducing, and because of the unique carbonyl to carbonyl linkage has great acid lability. Sucrose also hydrolyzes readily in acid systems to form invert sugar. The term invert sugar is used because prior to the hydrolysis, in the starting sucrose solution, a plane of polarized light rotates to the right and in the inverted solution a plane of polarized light rotates to the left.

Sucrose may be hydrolyzed with strong mineral or weak organic acids, the enzyme Invertase, or ion exchange resins. Commercial invert sugar is produced by the inversion of 96% cane sugar solution. The inversion is done at pH 3 to 4 by means of Invertase and diluted hydrochloric acid. The acid is typically neutralized with sodium carbonate to pH 6.5. At this higher pH, the dextrose crystallizes and the entire mass is beaten into a creamy plastic product.

Invert sugar is primarily used in commercial operations as a crystallization inhibitor and a food plasticizer. Invert sugars which can have various levels of sucrose inversions, are sweeter than sucrose at comparable concentrations. This greater sweetness is due to the D-fructose (levulose) component of the syrup.

U.S. Pat. No. 4,271,199 suggests the use of 1 to 25% invert sugar to improve chewing gum flavor. However, it exemplifies the use of 17% invert sugar. Such a high level of invert sugar causes gum to retain too much moisture, making the gum sticky and sweaty and causing problems with packaging and consumer satisfaction. This problem is especially evident in climates where the relative humidity is routinely high and also during seasons when the relative humidity level increases.

SUMMARY OF THE INVENTION

Chewing gum compositions employing invert sugar as a humectant have similar properties as chewing gum compositions that employ sorbitol as a humectant. Both gums have better flexibility, softness, less brittleness and less dry menthol.

It has been found however that using low levels of invert sugar as a humectant provides significant sensory benefits over gum employing sorbitol as a humectant. Gum compositions with invert sugar humectants have a higher mouth-filling flavor and a more refreshing taste, meaning that the flavor is more complex, balanced and full-bodied.

In addition, the low levels of invert sugar help the gum retain moisture at low relative humidity without causing the gum to take on excess moisture at high relative humidity. Low relative humidity for purposes of this invention is defined as 35% or lower. High relative humidity is defined as 75% or greater. Low levels of invert sugar provide a gum which will not become stale or brittle in low humidity conditions and will not become sticky or sweaty in high humidity conditions. Therefore, this invention provides a gum which will retain an adequate amount of moisture in various types of climates and seasons.

In accordance with one embodiment, the present invention provides a chewing gum composition wherein total invert sugar constitutes from about 0.1 to 5.0 percent by weight, and more preferably about 0.5 to 2.5 percent by weight of the chewing gum.

In accordance with another embodiment, the present invention provides a chewing gum composition wherein medium invert sugar constitutes from about 0.1 to 5.0 percent by weight, and more preferably about 0.5 to 3.0 percent by weight of the chewing gum.

In accordance with still another embodiment, the present invention provides a chewing gum composition wherein a mixture comprising total invert sugar and medium invert sugar constitutes from about 0.1 to 5.0 percent by weight of the chewing gum and more preferably about 0.5 to 2.0 percent by weight of the chewing gum.

In accordance with a further embodiment, the present invention provides a method of manufacturing a chewing gum composition employing total invert sugar as a humectant. The method comprises mixing chewable gum base with sweetener and flavoring to obtain a gum matrix, and then adding the total invert sugar.

In accordance with a still further embodiment, the present invention provides a method of manufacturing a chewing gum employing medium invert sugar as a humectant. The method comprises mixing chewable gum base with sweetener and flavoring to obtain a gum matrix, and then adding the medium invert sugar.

In accordance with a further embodiment, the present invention provides a method of manufacturing a chewing gum employing a mixture of total invert sugar and medium invert sugar as a humectant. The method comprises mixing chewable gum base with sweetener and flavoring to obtain a gum matrix, and then adding the mixture of total invert sugar and medium invert sugar.

DETAILED DESCRIPTION OF THE PRESENTLY PREFERRED EMBODIMENTS

The invention employs both total and medium invert sugar and mixtures thereof. Total invert sugar is composed of 72% total solids, of which 44% is levulose, 47% is dextrose, 6% is sucrose, 3% is polysaccharide and less than 0.5% is D-psicose. Medium invert sugar is composed of 76% solids, of which 28% is levulose, 29% is dextrose, 39% is sucrose, 3% is polysaccharide and less than 0.2% is D-psicose.

The present invention contemplates in one embodiment the use of total invert sugar as a humectant. The chewing gum composition preferably constitutes from about 0.1 to 5.0, and more preferably from about 0.5 to 2.5, percent by weight total invert sugar.

The present invention contemplates in another embodiment the use of medium invert sugar as a humectant. The chewing gum composition preferably constitutes from about 0.1 to 5.0, and more preferably from about 0.5 to 3.0, percent by weight medium invert sugar.

The present invention contemplates in a further embodiment the use of a mixture of total invert sugar and medium invert sugar as a humectant. The chewing gum composition preferably constitutes from about 0.1 to 5.0 percent by weight of the mixture and more preferably from about 0.1 to 2.0 percent by weight mixture.

A chewing gum composition typically comprises a water soluble bulk portion and a water insoluble chewable gum base portion, and typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber and natural latexes such as chicle. Resins include polyvinylacetate and terpene resins. Fats and oils may also be included in the gum base, including tallow, hydrogenated and partially hydrogenated vegetable oils and cocoa butter. Commonly employed waxes include paraffin, microcrystalline and natural waxes such as beeswax and carnauba. According to the preferred embodiment of the present invention, the insoluble gum base constitutes between about 15 to 30 percent by weight of the gum. More preferably the insoluble gum base comprises between about 20 to 30 percent by weight of the gum.

The gum base typically also includes a filler component. Commonly employed filler components include calcium carbonate, magnesium carbonate, talc, dicalcium phosphate and the like.

Gum bases typically also contain softeners, including glycerol monostearate and glycerol triacetate. Further gum bases may also contain optional ingredients such as anti-oxidants, colors and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol, mannitol, xylitol, and the like.

The water soluble portion of the chewing gum may further comprise softeners, sweeteners, flavoring agents and combinations thereof. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

The present invention relates to sugar-containing gum formulations. Sugar sweeteners may include saccharide components commonly known in the chewing gum art which comprise but are not limited to sucrose, dextrose, maltose, dextrin, dried invert sugar, fructose, levulose, galactose, corn syrup solids, and the like, alone or in any combination.

A flavoring agent may be present in the chewing gum in an amount within the range of from about 0.25 to 5.0 percent by weight of the gum. The flavoring agents may comprise essential oils, synthetic flavors, or mixture thereof including but not limited to oils derived from plants and fruits such as citrus oil, fruit essences, peppermint oil, spearmint oil, clove oil, oil of wintergreen, anise and the like. Artificial flavoring components are also contemplated. Those skilled in the art will recognize that natural and artificial flavoring agents may be present in any sensorially acceptable blend. All such flavors and flavor blends are contemplated by the present invention.

Optionally, high intensity sweeteners may be present in the chewing gum. These are typically natural or artificial compounds which are at least 20 times sweeter than sucrose including aspartame, acesulfame, cyclamates, saccharin, glycyrrhizin, dihydrochalcones, alitame, sucralose and their food acceptable salts.

Optional ingredients such as colors, emulsifiers and pharmaceutical agents may be added to the chewing gum.

In general, chewing gum is manufactured by sequentially combining the various chewing gum ingredients in any commercially available mixer known in the art. After the ingredients have been thoroughly mixed, the gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifiers may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

The total or medium invert sugar can be added by pumping it directly into the mixer or adding it by hand. The time of addition is not critical and late addition is preferred. It is to be understood that changes and modifications to the preferred embodiments described are contemplated by the invention. The following examples are not intended to limit the invention, but are included merely as an illustration of various embodiments.

EXAMPLES

Example 1

Gums A, B, and C were prepared as follows. Gum A was prepared according to the following formulation.

|  | Weight Percent |
|---|---|
| Sugar | 60.652 |
| Base | 20.217 |
| Corn Syrup | 17.751 |
| Sorbitol | — |
| Invert Sugar | — |
| Glycerin | 0.690 |
| Spearmint Flavor | 0.690 |

Gum B was prepared according to the following formulation.

|  | Weight Percent |
|---|---|
| Sugar | 59.764 |
| Base | 20.217 |
| Corn Syrup | 17.751 |
| Sorbitol | 0.888 |
| Invert Sugar | — |
| Glycerin | 0.690 |
| Spearmint Flavor | 0.690 |

Gum C was prepared according to the following formulation.

|  | Weight Percent |
|---|---|
| Sugar | 59.764 |
| Base | 20.217 |
| Corn Syrup | 17.751 |
| Sorbitol | — |
| Invert Sugar | 0.888 |
| Glycerin | 0.690 |
| Spearmint Flavor | 0.690 |

Sensory tests were then conducted to compare Gums A, B, and C. Trained panelists judged Gum C, the one employing invert sugar as a humectant, to have more mouth-filling flavor, to be less dry and waxy, to have a faster chewdown and to be more refreshing. Also when Gums A, B, and C were stored at accelerated conditions of 85° F. and 35% relative humidity, Gums B and C were more flexible than Gum A. Gums B and C retained about the same moisture which indicates invert sugar performs as well as sorbitol does as a humectant.

I claim:

1. A chewing gum composition having improved non-staling qualities and improved taste comprising chewable gum base, sweetener, flavoring, and a humectant comprising total invert sugar and said total invert sugar comprising between about 0.1 to 5.0 percent by weight of the chewing gum composition.

2. The chewing gum of claim 1 further comprising a bulking agent.

3. The chewing gum of claim 1 further comprising a softener.

4. A chewing gum composition having improved non-staling qualities and improved taste comprising chewable gum base, sweetener, flavoring, and a humectant comprising medium invert sugar and said medium invert sugar comprising between about 0.1 to 5.0 percent by weight of the chewing gum composition.

5. The chewing gum of claim 4 further comprising a bulking agent.

6. The chewing gum of claim 4 further comprising a softener.

7. A chewing gum composition having improved non-staling qualities and improved taste comprising chewable gum base, sweetener, flavoring, and a humectant comprising a mixture of total invert sugar and medium invert sugar and said mixture comprising between about 0.1 to 5.0 percent by weight of the chewing gum composition.

8. The chewing gum of claim 7 further comprising a bulking agent.

9. The chewing gum of claim 7 further comprising a softener.

10. A method of manufacturing a chewing gum composition having improved non-staling qualities and improved taste, the method comprising:
    a) mixing chewable gum base with sweetener and flavoring to obtain a gum matrix;
    b) adding invert sugar selected from the group consisting of total invert sugar, medium invert sugar or mixtures thereof to the gum matrix so as to obtain said gum composition containing from 0.1 to 5.0 weight percent invert sugar, based on the total weight of the gum composition;
    c) extruding said gum; composition; and
    d) sheeting said gum composition.

11. The method of claim 10 wherein total invert sugar is added in an amount sufficient to obtain a gum composition having between about 0.1 to 5.0 percent by weight total invert sugar.

12. The method of claim 10 wherein medium invert sugar is added in an amount sufficient to obtain a gum composition having between about 0.1 to 5.0 percent by weight medium invert sugar.

13. The method of claim 12 wherein a mixture of total invert sugar and medium invert sugar is added in an amount sufficient to obtain a gum composition having between about 0.1 to 5.0 percent by weight mixture.

14. The chewing gum of claim 1 comprising between about 0.1 to 2.5 percent by weight total invert sugar.

15. The chewing gum of claim 4 comprising between about 0.1 to 3.0 percent by weight medium invert sugar.

16. The chewing gum of claim 7 comprising between about 0.1 to 2.0 percent by weight of a mixture of total and medium invert sugar.

17. A chewing gum composition having improved flavor which maintains adequate moisture in low relative humidity and does not gain excessive moisture in high relative humidity, comprising a homogenous mixture of chewable gum base, sweetener, flavoring, and a humectant comprising invert sugar, said invert sugar comprising between about 0.1 to 5.0 percent by weight of the chewing gum composition.

* * * * *

UNITED STATES PATENT AND TRADEMARK OFFICE
CERTIFICATE OF CORRECTION

PATENT NO. : 5,286,499
DATED : February 15, 1994
INVENTOR(S) : Steven B. Courtright It is certified that error appears in the above-indentified patent and that said Letters Patent is hereby corrected as shown below:

<u>ON THE COVER PAGE</u>: (Item [73])

On the cover page, after "Assignee:" delete "Wm. Wrighley Jr. Company" and substitute therefor --Wm. Wrigley Jr. Company--.

Column 6:

In claim 10, line 30, delete "gum;" and substitute therefor --gum--.

Signed and Sealed this

Eleventh Day of October, 1994

Attest:

BRUCE LEHMAN

Attesting Officer     *Commissioner of Patents and Trademarks*